United States Patent [19]

Burgess et al.

[11] 3,786,993
[45] Jan. 22, 1974

[54] CONTROL SYSTEMS FOR ROCKET MOTORS

[75] Inventors: Brian Burgess, Bendley; Geoffrey Philip Thorp, Kidderminster, both of England

[73] Assignee: Imperial Metal Industries (Kynoch) Limited, Birmingham, Warwickshire, England

[22] Filed: May 22, 1972

[21] Appl. No.: 255,668

Related U.S. Application Data

[63] Continuation-in-part of Ser. No. 62,499, Oct. 10, 1970, abandoned, Continuation-in-part of Ser. No. 62,500, Oct. 10, 1970, abandoned.

[52] U.S. Cl................................ 239/265.19, 60/230
[51] Int. Cl.............................................. B63h 11/10
[58] Field of Search 239/265.19, 265.25 LS; 60/228, 60/229, 230, 242, 271

[56] References Cited
UNITED STATES PATENTS

| | | | |
|---|---|---|---|
| 3,150,486 | 9/1964 | Hollstein et al.................. | 60/228 X |
| 3,224,370 | 12/1965 | Vogt................................ | 60/230 X |
| 3,245,620 | 4/1966 | McEwen.......................... | 239/265.25 |

*Primary Examiner*—M. Henson Wood, Jr.
*Assistant Examiner*—John J. Love
*Attorney, Agent, or Firm*—Cushman, Darby & Cushman

[57] ABSTRACT

Thrust vector control system for a rocket motor comprising at least one spoiler blade pivotally mounted adjacent the exit end of the motor nozzle, the blade comprising an exhaust gas impingement element of refractory metallic material, a rigid metallic support, and an interposed layer of heat insulating material.

6 Claims, 7 Drawing Figures

CONTROL SYSTEMS FOR ROCKET MOTORS

This application is a continuation-in-part of our co-pending applications Ser. Nos. 62499 and 62500, both filed Aug. 10, 1970, and both now abandoned.

FIELD OF THE INVENTION

This invention relates to control systems for rocket motors and in particular to thrust vector control systems wherein the exhaust nozzle of the rocket motor is provided with spoiler blades for varying the thrust vector, thereby controlling the direction of flight of the motor.

DESCRIPTION OF THE PRIOR ART

Spoiler blades usually take the form of flat plates which are moved radially of the longitudinal nozzle axis so that a part of each blade having a straight exhaust entrant edge is immersed in the path of the exhaust gases passing through the nozzle thereby to block off part of the nozzle exit area. The effect of a spoiler blade so disposed in the path of the exhaust gases is to promote an oblique shock wave inside the nozzle expansion cone. The pressure resulting from the shock wave creates a turning moment on the wall of the nozzle adjacent the spoiler blade and thereby directs the rocket in a corresponding curved path.

Spoiler blades are, of necessity, subjected to high pressure and to erosive high temperature gas flow and a difficulty which has been experienced is to provide a blade construction which will withstand the high pressure as well as the high temperature gas flow.

The present invention, therefore, aims to provide a spoiler blade construction which is capable of withstanding the erosive effects of the exhaust gases at high temperatures, and which is also sufficiently robust and adequately mounted to withstand the pressures of the exhaust gases.

It has been proposed in U.S. Pat. No. 3,245,620 to provide a steering control for a solid fuel rocket in which a circular plate is pivotally mounted to cover one or more holes which comprise inlet ends of a plurality of nozzles of the rocket whereby throttling of gas flow into one nozzle causes the thrust achieved by that nozzle to be lowered compared to the thrust from the other nozzles. However, because this arrangement operates operates at the inlet to the nozzle, the circular plate operates in a region of subsonic exhaust gas flow and therefore shock waves may travel back into the combustion chamber from the plate and cause an increase in combustion chamber pressure. This tends to increase the burning rate of some propellants with a possible consequent build up to an explosive situation.

SUMMARY OF THE INVENTION

According to the present invention, a thrust vector control system is provided for a rocket motor having a nozzle with inlet and exit ends which causes gases exhausted from said rocket to said nozzle inlet end at subsonic velocities to attain supersonic velocities at the exit end of said nozzle, said control system comprising at least one spoiler blade which is pivotally mounted adjacent the exit end of said nozzle, said spoiler blade including an exhaust gas impingement element formed from refractory metallic material, a rigid metallic support member, and a layer of heat insulating material interposed between and in direct pressure contact with the impingement element and the support member to transmit pressure from the impingement element to the support member to support the impingement element against impingement of exhaust gases thereon.

Preferably, the impingement element is formed from one of the group molybdenum, tungsten, or silver impregnated tungsten.

Preferably also, the impingement element has a convex exhaust entrant edge which forms an arc of a circle of which the radius corresponds to the radius of the exhaust exit aperture of an exhaust nozzle of the rocket motor.

BRIEF DESCRIPTION OF THE DRAWINGS

In order to make the invention more clearly understood, one embodiment will now be described with reference to the accompanying drawings in which.

DESCRIPTION OF THE PREFERRED EMBODIMENT

Figure 1:
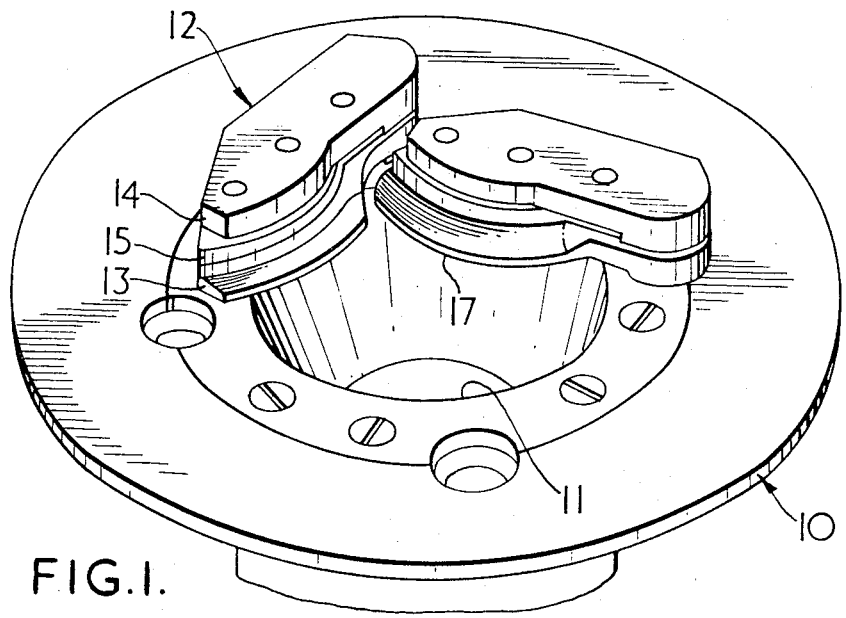
FIG. 1 is a perspective view of part of an exhaust nozzle assembly of a rocket motor showing two spoiler blades in operative position.

Referring initially to FIGS. 1 to 4 of the drawings, an exhaust nozzle 10 of a rocket motor has a nozzle with inlet and exit ends, an exit aperture being denoted by reference number 11. On the exit end of the nozzle 10, a thrust vector control system is provided comprising four spoiler blades 12 pivotally mounted adjacent the exit end of the nozzle. Each blade comprises an exhaust gas impingement element 13, a support member 14 and an intermediate insulating layer 15.

The impingement element 13 is formed from molybdenum and comprises a hatchet-shaped portion 16 having an exhaust entrant edge 17 which is convex, and a shank 18. The edge 17 forms an arc of a circle of which the radius is the same as that of the nozzle aperture 11. A planar face 19 of the element 13 forms an exhaust gas impingement surface and at the shank 18 a circular projection 20 depends from the face 19. The projection and shank are bored to provide a hole 21. The convex edge 17 is chamfered as at 23 and immediately behind the chamfer, the remainder of the element is reduced in thickness to provide a step 24.

The support member 14 is made from a high strength steel (60–70 tons/sq.in. (95–110 Kg/mm$^2$) tensile) and conforms generally to the shape of the element 13 without the chamfered portion 23. The lower surface of the member 14 is recessed to provide a step 25 which extends adjacent one end and one side of the member as indicated in chain line in FIG. 4. Adjacent one end of the member 14 a spindle 26 depends at right-angles from the lower surface of the member.

Figure 3:
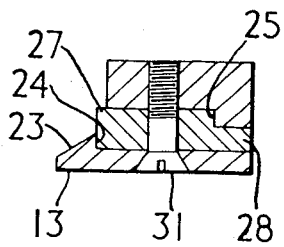
FIG. 3 is a cross-sectional view along '3—3' of FIG. 2.
Figure 2:
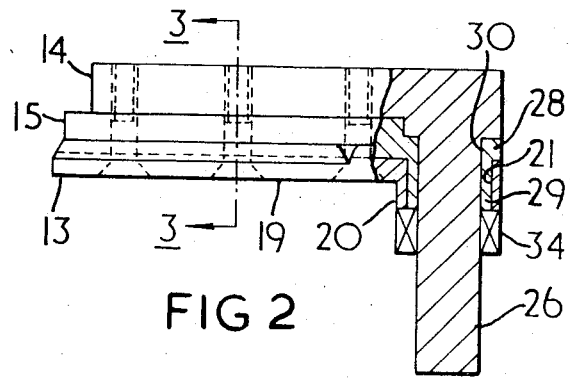
FIG. 2 is a front elevation, partly in section, of a spoiler blade and its associated spindle.
Figure 4:
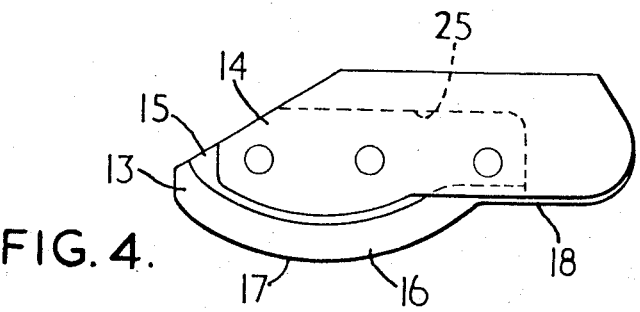
FIG. 4 is a plan view of the spoiler blade of FIG. 2.

The insulating layer 15 is formed from "Durestos," an asbestos phenolic, and has a body portion 27, a web 28 which extends laterally at one side and one end of the body portion, and an annular projection 29 externally dimensioned to fit the hole 21 in the element 13. The layer 15 is shaped to conform to the opposed stepped surfaces of the element 13 and the member 14 so as to sandwiched therebetween as indicated in FIG. 3 and in the sectioned portion of FIG. 2.

The layer 15 is bored as at 30 to receive the spindle 26 of the support member 14.

The element 13, layer 15 and member 14 are assembled together by means of three countersunk screws 31 made from molybdenum and are also bonded together with Bakelite resin J.11185 cured at 150°C for 1½ hours. The resin is obtainable from Bakelite Xylonite Ltd., London.

In a typical use of spoiler blades as described above, the four blades are mounted at equi-angular positions on the exit end of the nozzle 10 (FIGS. 1 and 5) of a solid propellant rocket motor of a missile having a mean axial thrust of 1,800 lb.f. (800 kg.f.). In the interests of clarity and to illustrate the construction of the blades, only two of the four blades are shown in FIG. 1.

Figure 5:
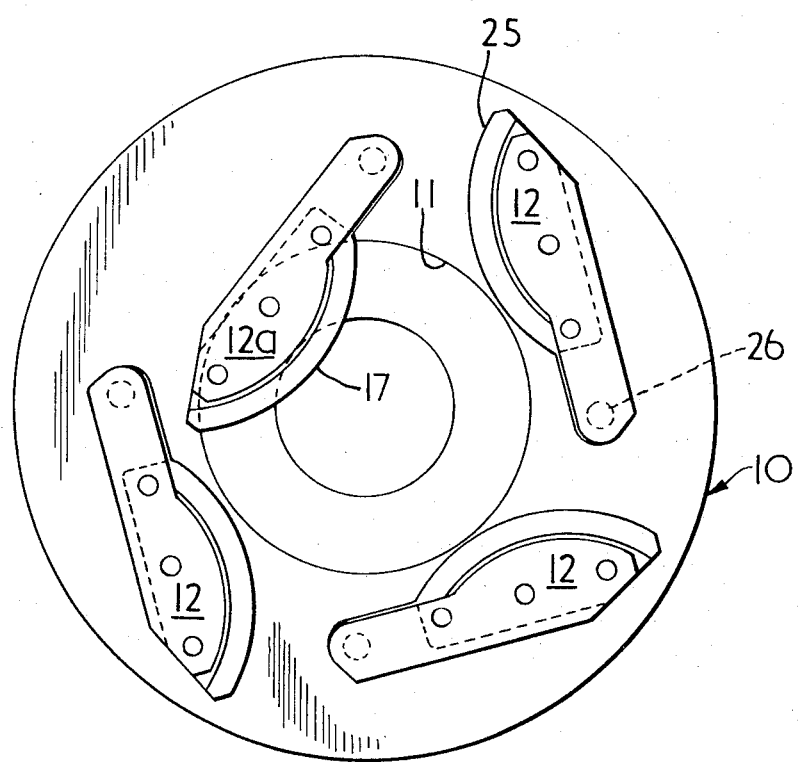
FIG. 5 is an end elevation of the exhaust nozzle provided with four spoiler blades, one being in the operative position.

The spindle 26 of each blade is located in and extends through a suitable bearing 34 (FIG. 2) adjacent the exit aperture of the exhaust nozzle. The end portion of each spindle which projects through its bearing 34, and is remote from the blade, is connected to an actuating means (not shown) which imparts a desired rotary motion to the spindle and thereby to the associated blade. The four blades are arranged in a series relationship around the nozzle 10 so that the convex edge 17 of each blade is movable radially of the nozzle. In FIG. 5, the blade denoted 12a is shown with a portion of the blade projecting partly across the nozzle exit aperture 11, whilst the other three blades are shown in their retracted position with their entrant edges 17 lying radially outside the aperture 11. When the rocket motor is fired, gases exhausted from the rocket at subsonic velocities attain supersonic velocities at the exit end of the nozzle. In order to steer the associated missile, any one or more of the spoiler blades may be moved to effect a greater or lesser degree of immersion of the blade into the efflux of exhaust gas. By this means, the distribution of forces on the wall of the nozzle resulting from the shock wave can be varied to alter the thrust vector of gas flow from the nozzle so that the consequential turning moment directs the missile along a predetermined curved path. Because the spoiler blades are disposed at the exit end of the nozzle and operate in an area of supersonic gas flow, shock waves are not transmitted back through the nozzle to the combustion chamber.

Tests have shown that with a spoiler blade of composite construction as described above, the molybdenum element 10 provides a non-eroding impingement surface for the exhaust gas and satisfactorily withstands a temperature of the order of 2,000°K for a propellant burning time of 6 seconds.

Furthermore, the "Durestos" insulating layer 15 insulates the stress bearing support member 11 to such an extent that the support member is kept sufficiently cool to maintain the rigidity of the blade. The blade, in fact, is found to be sufficiently rigid to prevent excessive "gas wash," ie leakage of exhaust gas between the blade and the nozzle, when the motor chamber operates at 700 psi (0.5 Kg/mm$^2$).

Figure 6:
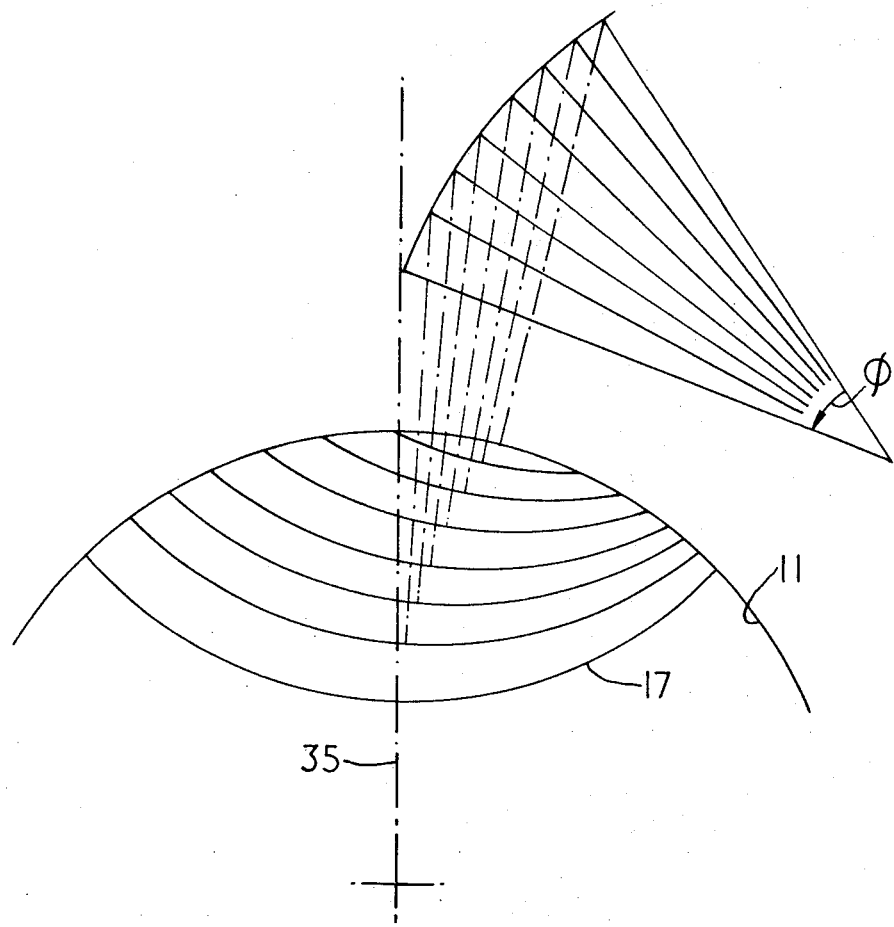
FIG. 6 is a schematic view showing the progressive movement of the entrant edge of a spoiler blade across the exhaust nozzle.

By means of the non-rectilinear nature of the entrant edge 17 of each spoiler blade, the blades can be designed so that the portion of each blade which projects into the aperture 11 and which is immersed in the exhaust gas stream is substantially symmetrical with respect to a corresponding radial plane of the nozzle passing through the centre of pressure of the immersed portion. FIG. 6 illustrates the progressive movement of the curved edge 17 of a spoiler blade across the nozzle aperture 11 in dependence on the angular movement $\phi$ of the blade through 36°. It will be seen that the immersed portion of the blade is substantially symmetrical with respect to a corresponding radial plane 35 of the aperture passing through the centre of pressure of the immersed portion.

With the above design of blade, the initial side force on the nozzle produced by immersion of the curved edge blade occurs at a position about 12° from the radial plane 35 of a fully immersed blade.

It is found, furthermore, that the side force in the radial plane has a substantially linear relationship with the angular movement of the blade.

Figure 7:
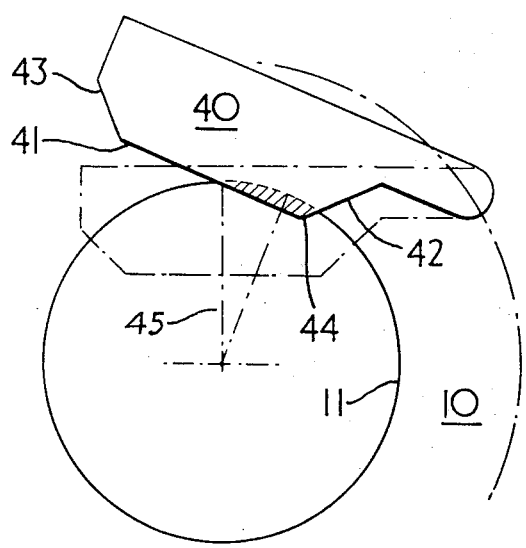
FIG. 7 is a schematic view of a known spoiler blade having a rectilinear entrant edge and illustrating the disadvantage thereof.

For purposes of comparison, and referring to FIG. 7, a spoiler blade 40 having a rectilinear entrant edge 41 is shown pivotally mounted on the exhaust nozzle 10. The edge 41 connects two chamfered ends 42, 43 of the blade and the obtuse corner formed by the edge 41 and the end 42 is denoted 44.

When the blade is fully immersed (as indicated by the broken-line contour) in the stream of exhaust gas being emitted from the nozzle, the entrant edge 41 is normal to the radial plane 45 which passes through the centre of pressure of the immersed portion of the blade. Only in this position of full immersion is the blade symmetrical with respect to such a radial plane. In all other positions of the blade, the shape of the immersed portion is unsymmetrical, as shown for example by the shaded area of the blade in FIG. 7.

Furthermore, at the commencement of immersion of the blade, the initial side force is produced at an angle of about 20° from the radial plane 45, compared with the 12° position obtained with the above described curved edge blade.

We claim:

1. A thrust vector control system for a rocket motor having a nozzle with inlet and exit ends which causes gases exhausted from said rocket to said nozzle inlet end at subsonic velocities to attain supersonic velocities at the exit end of said nozzle, said control system comprising at least one spoiler blade which is pivotally mounted adjacent the exit end of said nozzle, said spoiler blade including an exhaust gas impingement element formed from refractory metallic material, a rigid metallic support member, and a layer of heat insulating, asbestos-containing material interposed between the impingement element and the support member and having opposite surfaces which are substantially coextensive with and in direct pressure contact with the impingement element and the support member to transmit pressure from the impingement element to the support member to support the impingement element against impingement of exhasut gases thereon.

2. A thrust vector control system according to claim 1 wherein the impingement element is formed from one of the group molybdenum, tungsten, or silver impregnated tungsten.

3. A thrust vector control system according to claim 1 wherein the impingement element has a non-rectilinear exhaust entrant edge.

4. A thrust vector control system according to claim 3 wherein the entrant edge of the impingement element is convex.

5. A thrust vector control system for a rocket motor having a nozzle with inlet and exit ends which causes gases exhausted from said rocket to said nozzle inlet end at subsonic velocities to attain supersonic velocities at the exit end of said nozzle, said control system comprising at least one spoiler blade which is pivotally mounted adjacent the exit end of said nozzle, said spoiler blade including an exhaust gas impingement element formed from refractory metallic material and having a convex exhaust entrant edge which forms an arc of a circle of which the radius corresponds to the radius of the exhaust exit aperture of an exhaust nozzle of the rocket motor, a rigid metallic support member, a spindle projecting at a right angle to said support member a layer of heat insulating material interposed between the impingement element and the support member, said spindle extending through a hole formed through said layer and through said impingement element.

6. A control system according to claim 4 wherein the convex exhaust entrant edge forms an arc of a circle of which the radius is the same as that of the exit end of the nozzle.

* * * * *